United States Patent
Fennell et al.

(10) Patent No.: US 12,437,066 B2
(45) Date of Patent: Oct. 7, 2025

(54) SYSTEM AND METHOD FOR CLASSIFYING SUSPICIOUS TEXT MESSAGES RECEIVED BY A USER DEVICE

(71) Applicant: Bank of America Corporation, Charlotte, NC (US)

(72) Inventors: Scott Fennell, Carrollton, TX (US); Jennie Kathleen Egbert, Ventura, CA (US); Jeffrey Wayne Texada, Carrollton, TX (US)

(73) Assignee: Bank of America Corporation, Charlotte, NC (US)

( * ) Notice: Subject to any disclaimer, the term of this patent is extended or adjusted under 35 U.S.C. 154(b) by 269 days.

(21) Appl. No.: 18/344,189

(22) Filed: Jun. 29, 2023

(65) Prior Publication Data
US 2025/0005148 A1    Jan. 2, 2025

(51) Int. Cl.
*G06F 21/55*    (2013.01)
*H04L 9/00*    (2022.01)

(52) U.S. Cl.
CPC .............. *G06F 21/554* (2013.01); *H04L 9/50* (2022.05); *G06F 2221/034* (2013.01)

(58) Field of Classification Search
CPC .............. G06F 21/554; G06F 2221/034; G06F 21/562; H04L 9/50
See application file for complete search history.

(56) References Cited

U.S. PATENT DOCUMENTS

| | | | |
|---|---|---|---|
| 6,993,660 B1 * | 1/2006 | Libenzi | G06F 21/562 713/188 |
| 7,757,288 B1 * | 7/2010 | Khalsa | H04L 51/212 713/188 |
| 8,776,227 B1 | 7/2014 | Glick et al. | |
| 9,325,724 B2 | 4/2016 | Rihn et al. | |
| 9,729,489 B2 | 8/2017 | Appelman et al. | |
| 10,033,757 B2 | 7/2018 | Hodgman et al. | |
| 10,601,865 B1 | 3/2020 | Mesdaq et al. | |
| 11,030,410 B2 | 6/2021 | Murphy et al. | |

(Continued)

FOREIGN PATENT DOCUMENTS

| | | |
|---|---|---|
| EP | 3000212 B1 | 5/2020 |
| WO | 2017180512 A1 | 10/2017 |

(Continued)

OTHER PUBLICATIONS

U.S. Appl. No. 18/344,226 entitled, "System and Method for Intercepting and Classifying Suspicious Text Messages Between User Devices," filed Jun. 29, 2023.

*Primary Examiner* — Christopher A Revak

(57) ABSTRACT

A method for classifying a suspicious text message on a user device is disclosed. The method includes communicating between a classification processor and a user device, where the classification processor receives the suspicious text message from the user device, the suspicious text message having information data. The method includes applying a hashing function to the information data to generate hashed information data. The method includes storing the hashed information data in one or more of a plurality of network nodes in a blockchain network, and comparing the hashed information data to known hashed malicious data stored on a database. The method includes classifying the information data as containing malicious data based on the comparison.

20 Claims, 4 Drawing Sheets

(56) References Cited

U.S. PATENT DOCUMENTS

| | | | |
|---|---|---|---|
| 11,144,749 B1 | 10/2021 | Lo et al. | |
| 11,153,351 B2 | 10/2021 | Kalinin et al. | |
| 11,516,223 B2 | 11/2022 | Traore et al. | |
| 11,601,450 B1 | 3/2023 | Higbee et al. | |
| 12,041,087 B1* | 7/2024 | Morris | H04L 63/1425 |
| 12,083,971 B2* | 9/2024 | Ujiie | H04L 12/44 |
| 2003/0115485 A1* | 6/2003 | Milliken | H04L 51/212 |
| | | | 726/24 |
| 2005/0216564 A1 | 9/2005 | Myers et al. | |
| 2017/0244741 A1 | 8/2017 | Ferrer et al. | |
| 2020/0014542 A1* | 1/2020 | McIver | H04L 63/1425 |
| 2020/0327225 A1 | 10/2020 | Nguyen et al. | |
| 2021/0256113 A1* | 8/2021 | Stott | H04L 9/3239 |
| 2021/0281606 A1 | 9/2021 | Singh et al. | |
| 2021/0312041 A1 | 10/2021 | Gururajan et al. | |
| 2022/0269647 A1 | 8/2022 | Otus et al. | |
| 2024/0267410 A1* | 8/2024 | Gorter | H04L 63/1483 |

FOREIGN PATENT DOCUMENTS

| | | | | |
|---|---|---|---|---|
| WO | WO2020198187 A1 | 10/2020 | | |
| WO | WO-2021140007 A1 * | 7/2021 | | G06F 18/214 |
| WO | WO-2025069024 A1 * | 4/2025 | | |

\* cited by examiner

SYSTEM AND METHOD FOR CLASSIFYING SUSPICIOUS TEXT MESSAGES RECEIVED BY A USER DEVICE

TECHNICAL FIELD

The present disclosure relates generally to information security, and more specifically to a system and method for classifying suspicious text messages received by a user device.

BACKGROUND

"Smishing" is an attempt to collect sensitive data from a user with a malicious text message. Threat actors seeking to collect sensitive data often use malware (e.g., malicious links, malware websites and applications). Malware links may automatically download ransomware, viruses, trojans or any other type of malware that will compromise a computing system or network. A link to a malware website may bring the user to a fake website that requests you to type sensitive data into the website, which can be compromised by the threat actor. Similarly, a malicious link may automatically download a malware application that masquerades as a legitimate application, tricking the user to type in sensitive information into the application.

SUMMARY

The systems and methods described in the present disclosure provide practical applications and technical advantages that overcome the current technical problems described herein. As discussed above, threat actors that seek to gain access to sensitive information of corporations are continuously developing new malware and campaigns to acquire sensitive information. Currently, classifying malware techniques to proactively develop security actions that mitigate such threats can be an expensive and time-consuming process. Embodiments of the present disclosure are integrated into a practical application for classifying a suspicious text message as containing malicious and/or sensitive data. Once a suspicious text message has been classified as containing malicious and/or sensitive data, the systems and methods may be configured to delete the suspicious message from a user device and/or block a sender associated with the suspicious message.

In one embodiment, the provided systems and methods comprise a user device that allows a user to self-report the receipt of a suspicious message. For example, the user device in the provided systems and methods may comprise a report text message functionality (e.g., selectable icon or button) that transfers the suspicious text message from the user device to a classification processor. In general, the classification processor is configured to receive the suspicious text message and process information data associated with the suspicious text message. For example, the classification processor may parse the information data of the suspicious text message into a plurality of data components (e.g., time stamp data, text message content data, sender information data, recipient information data, and image data in the text message). The classification processor is also operatively coupled to a database in the system. The database is operable to store known hashed malicious data. The known hashed malicious data comprises known malicious data converted into a hash value using a hashing function. Storing data in the form of a hash value in the system offers the advantage of obfuscating the data for protection and allows for expanded storage capabilities by virtue of the hash value having a smaller data size. The classification processor is further configured to apply the hashing function to the information data of the suspicious text message to generate hashed information data, and store at least a portion of the hashed information data in one or more plurality of network nodes in a blockchain network. The classification processor is further configured to compare the hashed information data to the known hashed malicious data in the database, and classify at least a portion of the hashed information data associated with the suspicious text message as containing malicious data based on the comparison. In some embodiments, the classification processor compares the hashed information data to the known malicious data using a pattern matching technique (e.g., a regular expression pattern) to classify if the hashed information data contains malicious data or legitimate data. After classifying at least a portion of the information data associated with the suspicious text message as containing malicious data, the classification processor is further configured to generate a report that identifies the hashed information data as containing malicious data. In some embodiments, the classification processor is configured to delete the text message and/or block a sender associated with the suspicious text message on the user device.

In another embodiment, the provided systems and methods comprise a classification processor configured to intercept a suspicious text message sent between a first user device and a second user device. The classification processor is configured to classify the suspicious text message as containing legitimate or sensitive data. In some embodiments, the first user device may be managed by an entity or organization, and the first user device may communicate with the second user device via a network owned, or otherwise managed, by the entity or organization. In general, the classification processor is configured to intercept the suspicious text message sent between the first user device and the second user device and process information data associated with the suspicious text message. For example, the classification processor may parse the information data of the suspicious text message into a plurality of data components (e.g., time stamp data, sender information data, recipient information data, text message content data that may include a user identifier in the message data, a user password in the message data, a user account number in the message data, and/or a data transfer interaction in the message data). The classification processor is also operatively coupled to a database in the system. The database is operable to store known hashed sensitive data. The known hashed sensitive data comprises known sensitive data converted into a hash value using a hashing function. The classification processor is further configured to apply the hashing function to the information data of the suspicious text message to generate hashed information data, and store at least a portion of the hashed information data in one or more plurality of network nodes in a blockchain network. The classification processor is further configured to compare the hashed information data to the known hashed sensitive data in the database, and classify at least a portion of the hashed information data associated with the suspicious text message as containing sensitive data based on the comparison. In some embodiments, the classification processor compares the hashed information data to the known hashed sensitive data using a pattern matching technique (e.g., a regular expression pattern) to classify if the hashed information data contains sensitive data or legitimate data. After classifying at least a portion of the information data associated with the suspicious text message as containing sensitive data, the classification processor is further configured to capture the suspicious text message to prevent the suspicious text message from being communicated between the first user device and the second user device. In some embodiments, the classification processor is further configured to generate a report that identifies the hashed information data as containing sensitive data. In some embodiments, the classification processor is configured to block the communication between the first user device and the second user device.

The disclosed systems and methods provide several practical applications and technical advantages. First, the disclosed systems and methods provide real-time catch and release functionality of suspicious text messages on user devices in the network of the system. Real-time catch and release of suspicious text messages in the network provides the practical application and technical advantage of protecting the network from compromising sensitive data thereby improving network security. Second, storing the information data associated with the suspicious text message that contains malicious or sensitive information in the blockchain network can be used to update the database overtime. Updating the database intermittently or continuously with new, known hashed malicious data provides the practical application of improving network security by keeping current with the latest development of malicious attacks. Third, storing the data in the system in the form of a hash value offers the practical application of obfuscating the data for protection and allows for expanded storage capabilities by virtue of the hash value having a smaller data size.

In one embodiment, the present disclosure provides a system for classifying a suspicious text message. The system comprises a database operable to store known hashed malicious data, where the known hashed malicious data comprises known malicious data converted into a hash value using a hashing function. The system comprises a blockchain network comprising a plurality of network nodes that form a distributed network to maintain a blockchain. Each network node in the blockchain comprises a blockchain processor configured to distribute hashed information data associated with the suspicious text message mount the plurality of network nodes. The system comprises a classification processor operably coupled to the database and the blockchain network. The classification processor is configured to receive the suspicious text message from a user device, where the suspicious text message comprises information data. The classification processor is configured to apply the hashing function to the information data of the suspicious text message to generate hashed information data. The classification processor is configured to store at least a portion of the hashed information data in one or more of the plurality of network nodes in the blockchain network. The classification processor is further configured to compare the hashed information data to the known hashed malicious data in the database, and classify at least a portion of the hashed information data associated with the suspicious text message as containing malicious data.

In another embodiment, the present disclosure provides a system for classifying a suspicious text message communicated between a first user device and a second user device. The system comprises a database operable to store known hashed sensitive data, where the known hashed sensitive data comprises sensitive data converted into a hash value using a hashing function. The system comprises a blockchain network comprising a plurality of network nodes that form a distributed network configured to maintain a blockchain. Each network node of the blockchain network comprises a blockchain processor configured to distribute hashed information data associated with the suspicious text message among the plurality of network nodes. The system comprises a classification processor operable coupled to the database and the blockchain network, the processor configured to intercept a suspicious text message sent between the first user device and the second user device, where the suspicious text message comprises information data. The classification processor is configured to apply the hashing function to the information data of the suspicious text message to generate hashed information data. The classification processor is configured to store at least a portion of the hashed information data in one or more of the plurality of network nodes in the blockchain network, and compare the hashed information data to the known hashed sensitive data in the database. The classification processor is further configured to classify, based on the comparison, at least a portion of the information data associated with the suspicious text message as containing sensitive data.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
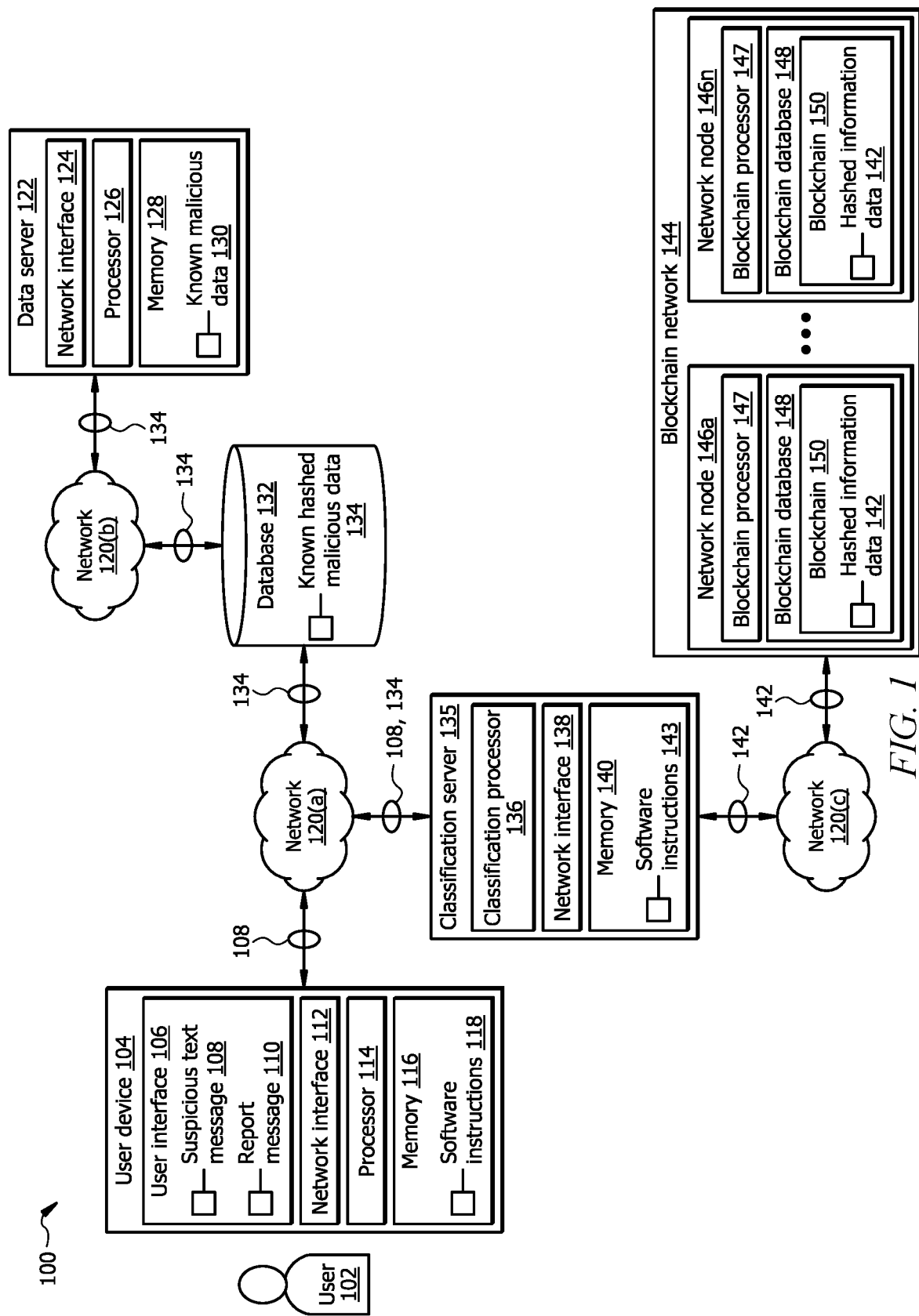
FIG. 1 illustrates a system according to an embodiment of the present disclosure.

In one embodiment, the present disclosure provides systems and methods that comprise a user device configured to allow a user to self-report the receipt of a suspicious message. For example, the user device in the provided systems and methods may comprise a report text message functionality (e.g., selectable icon or button) that transfers the suspicious text message from the user device to a classification processor. In general, the classification processor is configured to receive the suspicious message and process information data associated with the suspicious text message. For example, the classification processor may parse the information data of the suspicious text message into a plurality of data components (e.g., time stamp data, text message content data, sender information data, recipient information data, and image data in the text message). The classification processor is also operatively coupled to a database in the system. The database is operable to store known hashed malicious data. The known hashed malicious data comprises known malicious data converted into a hash value using a hashing function. Storing data in the form of a hash value in the system offers the advantage of obfuscating the data for protection and allows for expanded storage capabilities by virtue of the hash value having a smaller data size. The classification processor is further configured to apply the hashing function to the information data of the suspicious text message to generate hashed information data, and store at least a portion of the hashed information data in one or more plurality of network nodes in a blockchain network. The classification processor is further configured to compare the hashed information data to the known hashed malicious data in the database, and classify at least a portion of the information data associated with the suspicious text message as containing malicious data based on the comparison. In some embodiments, the classification processor compares the hashed information data to the known malicious data using a pattern matching technique (e.g., a regular expression pattern) to classify if the hashed information data contains malicious data or legitimate data. After classifying at least a portion of the information data associated with the suspicious text message as containing malicious data, the classification processor is further configured to generate a report that identifies the hashed information data as containing malicious data. In some embodiments, the classification processor is configured to delete the text message and/or block a sender associated with the suspicious text message on the user device.

In another embodiment, the provided systems and methods comprise a classification processor configured to intercept a suspicious text message sent between a first user device and a second user device. The classification processor is configured to classify the suspicious text message as containing legitimate or sensitive data. In some embodiments, the first user device may be managed by an entity or organization, and the first user device may communicate with the second user device via a network owned, or otherwise managed, by the entity or organization. In general, the classification processor is configured to intercept the suspicious text message sent between the first user device and the second user device and process information data associated with the suspicious text message. For example, the classification processor may parse the information data of the suspicious text message into a plurality of data components (e.g., time stamp data, sender information data, recipient information data, text message content data that may include text correspondence, a user identifier in the message data, a user password in the message data, a user account number in the message data, and/or a data transfer interaction in the message data). The classification processor is also operatively coupled to a database in the system. The database is operable to store known hashed sensitive data. The known hashed sensitive data comprises known sensitive data converted into a hash value using a hashing function. The classification processor is further configured to apply the hashing function to the information data of the suspicious text message to generate hashed information data, and store at least a portion of the hashed information data in one or more plurality of network nodes in a blockchain network. The classification processor is further configured to compare the hashed information data to the known hashed sensitive data in the database, and classify at least a portion of the hashed information data associated with the suspicious text message as containing sensitive data based on the comparison. In some embodiments, the classification processor compares the hashed information data to the known hashed sensitive data using a pattern matching technique (e.g., a regular expression pattern) to classify if the hashed information data contains sensitive data or legitimate data. After classifying at least a portion of the information data associated with the suspicious text message as containing sensitive data, the classification processor is further configured to capture the suspicious text message to prevent the suspicious text message from being communicated between the first user device and the second user device. In some embodiments, the classification processor is configured to generate a report that identifies the hashed information data as containing sensitive data. In some embodiments, the classification processor is configured to block the communication between the first user device and the second user device.

System Overview of FIG. 1

FIG. 1 illustrates an embodiment of a system 100 for classifying a suspicious text message 108. In some embodiments, the system 100 comprises a user device 104 operable to interact with a user 102 and configured to receive the suspicious text message 108, one or more network 120 (a)-(c), a data server 122 configured to store known malicious data 130, a database 132 configured to store known hashed malicious data 134, a classification server 135 configured to process the suspicious text message 108, and a blockchain network 144 configured to store at least a portion of hashed information data 142 associated with the suspicious text message 108.

In general, the user 102 may receive a suspicious text message 108 on the user device 104. The text message 108 could be any suitable text message received on a user device 104 including, but not limited to, a Short Message/Messaging Service (SMS), Multimedia Messaging Service (MMS), instant messenger messages, and the like. In response to receiving the suspicious text message 108, the user 102 may self-report the receipt of the suspicious text message 108 via a report message 110 functionality on the user device 104. For example, the report message 110 functionality may be a selectable feature (e.g., icon) in a user interface 106 of the user device 104 that allows the user to report the suspicious text message 108. Once the suspicious text message 108 has been reported via the report message 110 functionality, the suspicious text message 108 is communicated to the classification processor 136. In general, the classification processor 136 is configured to receive the suspicious text message 108 and process information data associated with the suspicious text message 108. In some embodiments, the classification processor 136 may parse the information data of the suspicious text message 108 into a plurality of data components (e.g., time stamp data, text message content data, sender information data, recipient information data, and image data in the text message). The database 132 is operable to store known hashed malicious data 134. The known hashed malicious data 134 comprises known malicious data 130 that has been converted into a hash value using a hashing function by the data server 122. The classification processor 136 is further configured to apply the hashing function to the information data of the suspicious text message 108 to generate hashed information data 142.

In some embodiments, the classification processor 136 is configured to store at least a portion of the hashed information data 142 in one or more of the plurality of network nodes 146 (a)-(n) in a blockchain network 144. The classification processor 136 is further configured to compare the hashed information data 142 to the known hashed malicious data 134 in the database 132, and classify at least a portion of the information data associated with the suspicious text message 108 as containing malicious data based on the comparison. After classifying at least a portion of the information data associated with the suspicious text message 108 as containing malicious data, the classification processor 136 is further configured to generate a report that identifies the hashed information data as containing malicious data. In some embodiments, the classification processor 136 is configured to delete the suspicious text message 108 from the user device 104 and/or block a sender associated with the suspicious text message 108 on the user device 108. In some embodiments, after classifying at least a portion of the information data associated with the suspicious text message 108 as containing malicious data, the classification processor 136 is configured to update the database 132 and/or in the blockchain network 144 to include the portion of the information data associated with the suspicious text message 108 that includes the malicious data. The updated portion is stored as known hashed malicious data 134 that can be used in future classifications of suspicious text messages 108.

System Components of FIG. 1

User Device

User device 104 is generally any device configured to receive a text message as well as interact with a user 102. For example, the user device 104 may be a mobile phone, a smartphone, an electronic tablet device, or a computer (e.g., personal computer, desktop, workstation, laptop). In some embodiments, the user device 104 is in signal communication with a classification server 135 via network 120 (*a*). The user device 104 may include a user interface 106. The user interface 106 may include a display for displaying the suspicious text message 108 and the report message 110 functionality. The user interface 106 may optionally include other terminal equipment that allows a user 102 to interact with the user device 104, which may include, but is not limited to, a mouse, a touchscreen, a keyboard, and the like.

The user device 104 may include a processor 114, a memory 116, and a network interface 112 configured to enable wired and/or wireless communications between the network 120 (*a*) and the user device 104, as well as other components in the system 100. Suitable network interfaces 112 include a WIFI interface, a local area network (LAN) interface, a wide area network (WAN) interface, a modem, a switch, or a router. The network interface 112 may be configured to use any suitable type of communication protocol as would be appreciated by one of ordinary skill in the art.

The processor 114 of the user device 104 is configured to send and receive data using the network interface 112. The processor 114 is operatively coupled to the memory 116. The memory 116 may be a non-transitory computer readable medium. For example, the memory 116 may be volatile or non-volatile and may comprise a read-only memory (ROM), random-access memory (RAM), ternary content-addressable memory (TCAM), dynamic random-access memory (DRAM), and static random-access memory (SRAM). The memory 116 may be implemented using one or more disks, tape drives, solid-state drives, and/or the like. The memory 116 is operable to store software instructions 118. The software instructions 118 may comprise any suitable set of instructions, logic rules or code operable to execute the processor 114 to perform the operations of the user device 104 described herein. In particular, the software instructions 118 may include code for the report message 110 functionality and code for communicating the suspicious text message 108 to the classification processor 136.

The processor 114 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 114 may be implemented in cloud devices, servers, virtual machines, and the like. The processor 114 may be a programmable logic device, a microcontroller, a microprocessor, or any suitable combination of the preceding. The processor 114 is configured to process data and may be implemented in hardware or software. For example, the processor 114 may be 8-bit, 16-bit, 32-bit, 64-bit, or of any other suitable architecture. The processor 114 may include an arithmetic logic unit (ALU) for performing arithmetic and logic operations, registers the supply operands to the ALU and store the results of ALU operations, and a control unit that fetches instructions from memory 116 and executes them by directing the coordinated operations of the ALU, registers and other components. The processor 114 is configured to implement various instructions described herein. For example, the processor 112 is configured to execute instructions from the memory 116 (e.g., software instructions 118) to implement the functions of the processor 114. In this way, processor 114 may be a special-purpose computer designed to implement the functions disclosed herein. In an embodiment, the processor 114 is implemented using logic units, FPGAs, ASICs, DSPs, or any other suitable hardware.

Network

Network 120 (*a*)-(*c*) may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 120 (*a*)-(*c*) may be configured to support any suitable type of communication protocol as would be appreciated by one of ordinary skill in the art. In some embodiments, the network 120 (*a*) facilitates the transfer of data between the user device 104, the classification server 135, and the database 132. In some embodiments, the network 120 (*b*) facilitates the transfer of data between the data server 122 and the database 132. In some embodiments, the network 120 (*c*) facilitates the transfer of data between blockchain network 144 and the classification server 135.

Data Server

The data server 122 is generally configured to store known malicious data in a memory 128. In some embodiments, the database server 122 is in communication with a third-party source that updates (e.g., intermittently or continuously) the memory 128 with new, known malicious data 130. Exemplary third-party sources include external databases or servers that contain known malicious data. The data server 122 comprises a network interface 124 that is configured to enable wired and/or wireless communications between the data server 122 and the network 120 (*b*), as well as other components in the system 100. Suitable network interfaces 124 include a WIFI interface, a local area network (LAN) interface, a wide area network (WAN) interface, a modem, a switch, or a router. The network interface 124 may be configured to use any suitable type of communication protocol as would be appreciated by one of ordinary skill in the art.

The data server 122 includes a processor 126. The processor 126 of the data server 122 is configured to send and receive data using the network interface 124. The processor 126 is operatively coupled to the memory 128. The memory 128 may be a non-transitory computer readable medium. For example, the memory 128 may be volatile or non-volatile and may comprise a read-only memory (ROM), random-access memory (RAM), ternary content-addressable memory (TCAM), dynamic random-access memory (DRAM), and static random-access memory (SRAM). The memory 128 may be implemented using one or more disks, tape drives, solid-state drives, and/or the like. The memory 128 is operable to store known malicious data 130. Exemplary known malicious data 130 includes malware (e.g., malicious links, malware websites and applications). The data server 122 may be a repository or database that stores known malware.

The processor 126 is any is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 126 may be implemented in cloud devices, servers, virtual machines, and the like. The processor 126 may be a programmable logic device, a microcontroller, a microprocessor, or any suitable combination of the preceding. The processor 126 is configured to process data and may be implemented in hardware or software. For example, the processor 126 may be 8-bit, 16-bit, 32-bit, 64-bit, or of any other suitable architecture. The processor 126 may include an arithmetic logic unit (ALU) for performing arithmetic and logic operations, registers the supply operands to the ALU and store the results of ALU operations, and a control unit that fetches instructions from memory 128 and executes them by directing the coordinated operations of the ALU, registers and other components. The processor 126 is configured to implement various instructions. For example, the processor 126 is configured to execute instructions from the memory 128 to implement the functions of the processor 126. In this way, processor 126 may be a special-purpose computer designed to implement the functions disclosed herein. In an embodiment, the processor 126 is implemented using logic units, FPGAs, ASICs, DSPs, or any other suitable hardware.

In some embodiments, the processor 126 of the data server 122 is configured to convert the known malicious data 130 into known hashed malicious data 134 and communicate the known hashed malicious data 134 to the database 123 via the network 120 (b). In some embodiments, the processor 126 converts the known malicious data 130 into known hashed malicious data 134 using a hashing function. Any suitable hashing function may be used including, but not limited to, MD5 hash functions, SHA-0 hash functions, SHA-1 hash functions, SHA-2 hash functions, SHA-3 hash functions, and the like. The known hashed malicious data 134 includes a hash value (e.g., a unique identifier comprising a string or number of a fixed length that is generated as a result of the hashing function).

Database

The database 132 may be any storage architecture. Examples of the database 132 may include a data store, a data warehouse, a network-attached storage cloud, a storage area network, and any storage assembly directly (or indirectly) coupled to the classifications server 135 via the network interface 138, or any one or more components in the system 100. The database 132 is configured to store known hashed malicious data 134. In some embodiments, the database 132 is integrated into the memory 128 of the data server 122.

Classification Server

The classification server 135 comprises a network interface 138 configured to enable wired and/or wireless communications between the classification server 135, the network 120 (a) and the network 120 (c), as well as other components in the system 100. Suitable network interfaces 138 include a WIFI interface, a local area network (LAN) interface, a wide area network (WAN) interface, a modem, a switch, or a router. The network interface 138 may be configured to use any suitable type of communication protocol as would be appreciated by one of ordinary skill in the art.

The classification server 135 comprises a classification processor 136. The classification processor 136 is configured to send and receive data using the network interface 138. The classification processor 136 is operatively coupled to a memory 140. The memory 140 may be a non-transitory computer readable medium. For example, the memory 140 may be volatile or non-volatile and may comprise a read-only memory (ROM), random-access memory (RAM), ternary content-addressable memory (TCAM), dynamic random-access memory (DRAM), and static random-access memory (SRAM). The memory 140 may be implemented using one or more disks, tape drives, solid-state drives, and/or the like. The memory 140 is operable to store software instructions 143. The software instructions 143 may comprise any suitable set of instructions, logic rules or code operable to execute the processor 138 to perform the operations of the classification processor 136 described herein.

The classification processor 136 is any is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the classification processor 136 may be implemented in cloud devices, servers, virtual machines, and the like. The classification processor 136 may be a programmable logic device, a microcontroller, a microprocessor, or any suitable combination of the preceding. The classification processor 136 is configured to process data and may be implemented in hardware or software. For example, the classification processor 136 may be 8-bit, 16-bit, 32-bit, 64-bit, or of any other suitable architecture. The classification processor 136 may include an arithmetic logic unit (ALU) for performing arithmetic and logic operations, registers the supply operands to the ALU and store the results of ALU operations, and a control unit that fetches instructions from memory 140 and executes them by directing the coordinated operations of the ALU, registers and other components. The classification processor 136 is configured to implement various instructions. For example, the classification processor 136 is configured to execute software instructions 143 from the memory 140 to implement the functions of the classification processor 136 described herein. In this way, classification processor 136 may be a special-purpose computer designed to implement the functions disclosed herein. In an embodiment, the classification processor 136 is implemented using logic units, FPGAs, ASICS, DSPs, or any other suitable hardware. In some embodiments, the classification processor 136 may be configured to perform quantum computing and processing.

In some embodiments, the classification processor 136 is configured to receive the suspicious text message 108 from user device 104 and process information data associated with the suspicious text message 108. For example, the classification processor may parse the information data of the suspicious text message into a plurality of data components. Exemplary data components include, but are not limited to, time stamp data (e.g., date and time when the message was sent and/or received), text message content data (e.g., raw message content, URL links, email addresses, phone number, text data classification such as classifying as non-public information data, proprietary data, public data, and/or user actions such as responding to the sender or forwarding the text), sender information data (e.g., phone number of sender, spoofed number identification, and/or threats associated with the sender number), recipient information data (e.g., number of recipients, phone number of recipient, access of recipient in the network, role and/or position of the recipient), image data (e.g., perform image analysis to process a portion or all of an image in the suspicious text message 108 for comparison to known data). The classification processor 136 is further configured to apply the hashing function to the information data of the suspicious text message 108 to generate hashed information data 142. In some embodiments, the classification processor 136 is configured to apply the hashing function to each of the plurality of data components such that the hashed information data 142 comprises a plurality of hashed data components. In some embodiments, the classification processor 136 is configured to store at least a portion of the hashed information data 142 in one or more of the plurality of network nodes 146 (a)-(n) in the blockchain network 144.

The classification processor 136 is configured to compare the hashed information data 142 to the known hashed malicious data 134 in the database 132, and classify at least a portion of the hashed information data associated with the suspicious text message 108 as containing malicious data based on the comparison. In some embodiments, comparing the hashed information data 142 to the known hashed malicious data 134 includes determining a similarity score that quantifies the similarity between the hashed information data 142 to the known hashed malicious data 134, and comparing the similarity score to a threshold value. If the similarity score is below the threshold value, the classification processor 136 classifies the hashed information data 142 as containing legitimate data. Conversely, if the similarity score is above the threshold value, the classification processor 136 classifies the hashed information data 142 as containing malicious data. In some embodiments, comparing the hashed information data 142 to the known hashed malicious data 134 further includes comparing the similarity score to a threshold percentage of the threshold value. For example, in some instances, if the similarity score is within a threshold percentage (e.g., within 1% to 20%) of the threshold value, the classification processor 136 may generate a notification that requests an analyst with administrative privileges in the network 120 (a)-(c) to manually review the comparison before classifying the hashed information data 142 associated with the suspicious text message 108 as containing legitimate or malicious data. The classification processor 136 may assign weighted values (ranging between 0 to 1) to particular data components in the information data of the suspicious text message 108.

Any suitable similarity score may be used including, but not limited to, K-means clustering. Hierarchical clustering, cosine similarity, kernel function, Euclidean distance, Manhattan distance, Minkowski distance, or the like. In some embodiments, after classifying at least a portion of the information data associated with the suspicious message 108 as containing malicious data, the classification processor 136 is configured to generate a report that identifies the hashed information data 142 as containing malicious data. In some embodiments, the classification processor 136 is configured to block a sender associated with the suspicious text message on the user device 104, and may optionally delete the suspicious message from the user device 104. In some embodiments, after classifying at least a portion of the hashed information data 142 as containing malicious data, the classification processor 136 is configured to update the database 132 and/or blockchain network 144 to include the portion of the hashed information data 142 that is classified as containing the malicious data.

Blockchain Network

Blockchain network 144 is a peer-to-peer network of network nodes 146 (a)-(n), and is generally configured to distribute hashed information data 142 (and any other data/ information) among the network nodes 146 (a)-(n). In some embodiments, the blockchain network 144 is a distributed database in a network of network nodes 146 (a)-(n). In some embodiments, blockchain network 144 may be a public blockchain network. In some embodiments, blockchain network 144 may be a private blockchain network. For example, membership in the blockchain network 144 may be limited to nodes registered as belonging to and/or affiliated with the organization to which the network 120 (a)-(b) belongs.

The blockchain network 144 may comprise any number of network nodes 146 (a)-(n) to form a distributed network that maintains a blockchain 150. Each network node 146 (a)-(n) may comprise a computing device, a virtual machine, a server, a workstation, and/or the like. Each network node 146 (a)-(n) of the blockchain network 144 stores a blockchain database 148 that is configured to store a copy of the blockchain 150. Each network node may include a blockchain processor 147 configured to perform any of the functions or actions of the network node 146 (a)-(n) described herein. The blockchain processor 147 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the blockchain processor 147 may be implemented in cloud devices, servers, virtual machines, and the like. The blockchain processor 147 may be a programmable logic device, a microcontroller, a microprocessor, or any suitable combination of the preceding. The blockchain processor 147 is configured to process data and may be implemented in hardware or software. For example, the blockchain processor 147 may be 8-bit, 16-bit, 32-bit, 64-bit, or of any other suitable architecture. The blockchain processor 147 may include an arithmetic logic unit (ALU) for performing arithmetic and logic operations, registers the supply operands to the ALU and store the results of ALU operations, and a control unit that fetches instructions from the blockchain database 148 and executes them by directing the coordinated operations of the ALU, registers and other components. The blockchain processor 147 is configured to implement various instructions described herein. In this way, processor 147 may be a special-purpose computer designed to implement the functions disclosed herein. In an embodiment, the blockchain processor 147 is implemented using logic units, FPGAs, ASICs, DSPs, or any other suitable hardware. In some embodiments, the blockchain network 144 communicates with the classification processor 136 via network interface 138.

In some embodiments, the blockchain processor 147 is configured to establish consensus among the network nodes 146 (a)-(n) about the present state of the blockchain database 148. For example, the blockchain processor 147 may communicate with each respective network node 146 (a)-(n) to implement a consensus protocol procedure through which all the network nodes 146 (a)-(n) of the blockchain network 144 reach a common agreement about the present state of the blockchain database 148. In this way, each network node 146 (a)-(n) achieves reliability in the blockchain network 144 and establishes trust between the network nodes 146 (a)-(n) in a distributed computing environment. Essentially, the consensus protocol makes sure that every new block that is added to the blockchain 150 is the one and only version of the truth that is agreed upon by all the block in the blockchain 150. Blockchain 150 links together blocks of data, which store identifiable units called blockchain data entries. The blockchain data entry may be interchangeably referred to herein as a blockchain data entry. The blockchain data entries stored in the blockchain 150, may include information, files, and/or any other suitable type of data. For example, blockchain data entries may include hashed information data 142 received from the classification processor 136.

System Operation

Figure 2:
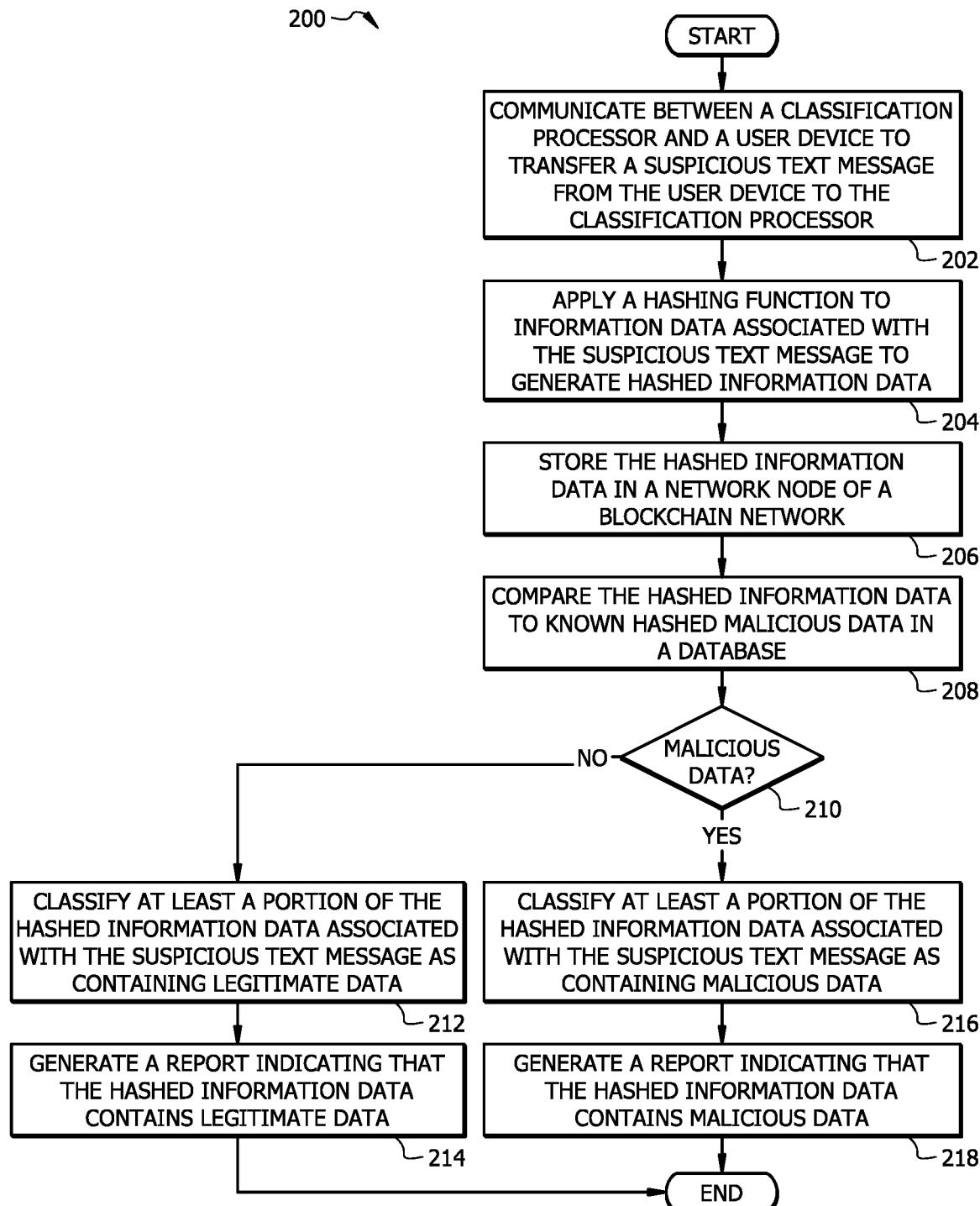
FIG. 2 illustrates a flowchart of a method according to the embodiment of FIG. 1.

FIG. 2 illustrates an operation flow 200 of the system of FIG. 1 for classifying a suspicious text message 108. The operational flow 200 can be logically described in two parts. The first part includes operations 202-208, which are generally directed to the classification processor 136 communicating with the user device 102 to receive the suspicious text message 108, generating hashed information data 142 by applying a hashing function to information data associated with the suspicious text message 108, and storing the hashed information data 142 in one or more network node 146 (a)-(n) of a blockchain network 144. The first part further includes comparing the hashed information data 142 to known hashed malicious data 134 in the database 132 and/or the blockchain network 144. The second part includes operations 212-218, which are generally directed to classifying at least a portion of the of the hashed information data 142 associated with the suspicious text message 108 as containing malicious data or legitimate data based on the comparison, and generating a report indicating that the hashed information data 142 contains malicious or legitimate data.

In operation, the operational flow 200 may begin at operation 202 where the classification processor 136 communicates with the user device 104 to transfer the suspicious text message 108 from the user device 104 to the classification processor 136. For example, a user 102 may initiate the transfer of the suspicious text message 108 from the user device 104 to the classification processor 136 by reporting the suspicious text message 108 via the report message 110 functionality on the user device 104. In general, the classification processor 136 receives the suspicious text message 108 and processes information data associated with the suspicious text message 108. For example, operation 202 may further comprise parsing the information data associated with the suspicious text message 108 into a plurality of data components. For example, as discussed above, the information data associated with the suspicious text message 108 may be parsed into data components selected from at least one of: time stamp data, text message content data, sender information data, recipient information data, and text message image data.

At operation 204, the classification processor 136 applies the hashing function to the information data of the suspicious text message 108 to generate hashed information data 142. In some embodiments, the classification processor 136 applies the hashing function to each of the plurality of data components to generate hashed information data 142 that comprises a plurality of hashed data components. At operation 206, the classification processor 136 stores at least a portion of the hashed information data 142 in one or more of the plurality of network nodes 146 (a)-(n) in the blockchain network 144. In some embodiments, the classification processor 136 stores at least a portion of the plurality of hashed data components of the hashed information data 142 in one or more of the plurality of network nodes 146 (a)-(n) in the blockchain network 144. As will be detailed below, the classification processor 136 may store hashed information data 142 that is classified as containing known malicious data in the blockchain network 144.

At operation 208, the classification processor 136 compares the hashed information data 142 to the known hashed malicious data 134 in the database 132 and/or in the blockchain network 144 to determine at decision block 210 if at least a portion of the hashed information data 142 contains malicious data or legitimate data. In some embodiments, the classification processor 136 may compare each of the plurality of the hashed data components of the information data to the known hashed malicious data. In some embodiments, comparing the hashed information data 142 to the known hashed malicious data 134 includes determining a similarity score that quantifies the similarity between the hashed information data 142 (e.g., the data components of the hashed information data 142) to the known hashed malicious data 134, and comparing the similarity score to a threshold value. For example, at least a portion of the hashed data components in the hashed information data 142 may have a similarity score above the threshold value and may be classified as containing malicious data, while another portion of the hashed data components in the hashed information data 142 may have a similarity score below the threshold value and may be classified as containing legitimate data. In some embodiments, comparing the hashed information data 142 to the known hashed malicious data 134 further includes comparing the similarity score to a threshold percentage of the threshold value. For example, in some instances, if the similarity score is within a threshold percentage (e.g., within 1% to 20%) of the threshold value, the classification processor 136 may generate a notification that requests an analyst with administrative privileges in the network 120 (a)-(c) to manually review the comparison before classifying the hashed information data 142 associated with the suspicious text message 108 as containing legitimate or malicious data. Any suitable similarity score may be used including, but not limited to, K-means clustering. Hierarchical clustering, cosine similarity, kernel function, Euclidean distance, Manhattan distance, Minkowski distance, or the like.

If the similarity score is below the threshold value, the classification processor 136 classifies the hashed information data 142 as containing legitimate data at operation 212. At operation 214, the classification processor 136 generates a report, or otherwise generates a notification, that identifies the hashed information data 142 as containing legitimate data if the similarity score is below the threshold value. In some embodiments, if the similarity score is within the threshold percentage of the threshold value, the analyst may manually review and provide input to the classification processor 136 to classify the hashed information data 142 as containing legitimate data. In some embodiments, the report or notification may be optionally stored in the blockchain 150 of the blockchain network 144 and/or communicated to an analyst with administrative privileges in the network 120 (a)-(c) for review and further manual analysis. In some embodiments, the classification processor 136 compares the hashed information data 142 to the known malicious data 134 using a pattern matching technique to classify if the hashed information data 142 contains malicious data or legitimate data. For example, operation 208 may include identifying a regular expression (e.g., regex) pattern for the hashed information data 142 within the known hashed malicious data 134 and classifying the hashed information data 142 as containing legitimate data or malicious data based on the comparison. For example, the regular expression pattern may be a sequence of characters that specifies a match pattern.

Returning back to decision block 210, if the similarity score is above the threshold value, the classification processor 136 classifies the hashed information data 142 as containing malicious data at operation 216. In some embodiments, if the similarity score is within the threshold percentage of the threshold value, the analyst may manually review and provide input to the classification processor 136 to classify the hashed information data 142 as containing malicious data. At operation 218, the classification processor 136 generates a report, or otherwise generates a notification, that identifies the hashed information data 142 as containing malicious data. In some embodiments, the report or notification may be optionally stored in the blockchain 150 of the blockchain network 144 and/or communicated to an analyst with administrative privileges in the network 120 (a)-(c) for review and manual analysis. In some embodiments, after classifying at least a portion of the hashed information data 142 as containing malicious data, the classification processor 136 is configured to update the blockchain network 144 and/or the database 132 to include the portion of the hashed information data 142 that is classified as containing the malicious data (e.g., the blockchain network 144 and/or the database 132 may be updated with one or more hashed data components of the hashed information data 142 identified as containing malicious data). In some embodiments, operation 218 comprises using the classification processor 136 to block a sender associated with the suspicious text message 108 on the user device 104 and optionally delete the suspicious text message 108 from the user device 104.

In one non-limiting example, the classification processor 136 may receive the suspicious text message 108 at operation 202 and parse the information data associated with the suspicious text message 108 into a first data component (e.g., a sender phone number of the suspicious text message 108), a second data component (e.g., an image in the suspicious text message 108), and a third data component (e.g., a URL link in the suspicious text message). The classification processor 136 may apply the hashing function at operation 204 to the first data component, the second data component, and the third data component to generate a first hashed data component, a second hashed data component, and a third hashed data component. At operation 206, the classification processor 136 may store the first hashed data component, the second hashed data component, and the third hashed data component in one or more of the plurality of network nodes 146 (a)-(n) of the blockchain network 144. At operation 208, the classification processor 136 may compare the first hashed data component, the second hashed data component, and the third hashed data component to known hashed malicious data 134 in the database 132. In this example, the known hashed malicious data 134 includes a hash value that substantially corresponds to the third hashed data component, while the first hashed data component and the second hashed data component do not substantially correspond to any hash value in the known hashed malicious data 134. That is, a similarity score is calculated between the hash value in the known hashed malicious data 134 and the third hashed data component and determined to exceed a threshold value, while the similarity scores for the first hashed data component and the second data component do not exceed a threshold value with any of the hash values in the known hashed malicious data 134. At operation 212, the classification processor 136 classifies, based on the comparison, the first hashed data component as containing legitimate data, the second hashed data component as containing legitimate data, and the third hashed data component as containing malicious data.

Figure 3:
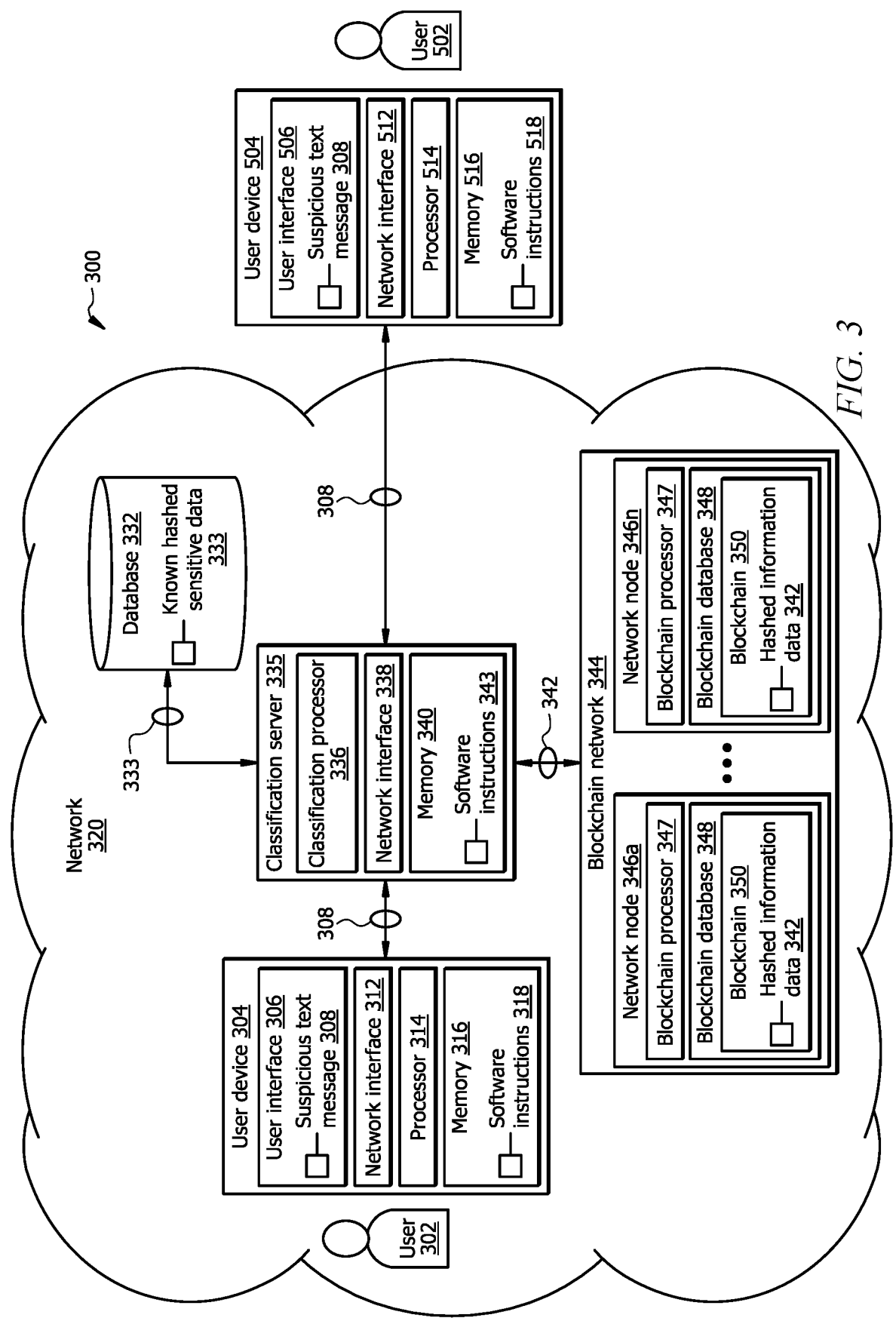
FIG. 3 illustrates a system according to another embodiment of the present disclosure.

System Overview of FIG. 3

FIG. 3 illustrates an embodiment of a system 300 for classifying a suspicious text message 308 communicated between a first user device 304 and a second user device 504. In some embodiments, the system 300 includes a first user device 304 operable to interact with a first user 302 and a second user device 504 operable to interact with a second user 502. The second user device 504 can communicate with the first user device 304 via network 320. The system 300 further comprises a database 332 configured to store known hashed sensitive data 333, a classification server 335 configured to process the suspicious text message 308, and a blockchain network 344 configured to store hashed information data 342 associated with the suspicious text message 308.

In some embodiments, the second user device 504 may attempt to communicate a suspicious text message 308 to the first user device 304 via network 320. In some embodiments, the first user device 304 and the network 320 may be managed by an entity or organization who regulates the network traffic and messages communicated through the network 320, while the second user device 504 may be managed by a separate entity or separate organization. In general, the classification processor 336 is configured to intercept the suspicious text message 308 sent between the first user device 304 and the second user device 504 and process information data associated with the suspicious text message 308.

For example, the classification processor 336 may parse the information data of the suspicious text message 308 into a plurality of data components (e.g., time stamp data, sender information data, recipient information data, text message content data such as sentences within the message data, a user identifier in the message data, a user password in the message data, a user account number in the message data, and/or information associated with a data transfer interaction in the message data). The classification processor 336 is also operatively coupled to a database 332 in the system 300. The database 332 is operable to store known hashed sensitive data 333. The known hashed sensitive data 333 comprises known sensitive data converted into a hash value using a hashing function. The known sensitive data may be sourced from a data server (not shown), which may be a repository or database that stores known sensitive data (e.g., user identifiers, user passwords, user account numbers, information associated with a data transfer interaction).

The classification processor 336 is further configured to apply the hashing function to the information data of the suspicious text message 308 to generate hashed information data 342, and store at least a portion of the hashed information data 342 in one or more of the plurality of network nodes 346 (a)-(n) in a blockchain network 344. The classification processor 336 is further configured to compare the hashed information data 342 to the known hashed sensitive data 333 in the database 332, and classify at least a portion of the hashed information data 342 associated with the suspicious text message 308 as containing sensitive data based on the comparison. In some embodiments, the classification processor compares the hashed information data to the known hashed sensitive data using a pattern matching technique (e.g., a regular expression pattern) to classify if the hashed information data contains sensitive data or legitimate data. After classifying at least a portion of the information data associated with the suspicious text message 308 as containing sensitive data, the classification processor 336 is further configured to capture the suspicious text message to prevent the suspicious text message from being communicated between the first user device and the second user device. In some embodiments, the classification processor is configured to generate a report that identifies the hashed information data as containing sensitive data. In some embodiments, the classification processor is configured to block the communication between the first user device 304 and the second user device 504.

System Components of FIG. 3
User Devices

The first user device 304 and the second user device 504 are generally any device configured to send and receive a text message as well as interact with a respective user 302, 502. For example, the first and second user devices 304, 504 may be a mobile phone, a smartphone, an electronic tablet device, or a computer (e.g., personal computer, desktop, workstation, laptop). In some embodiments, the first and second user device 304, 504 are in signal communication with the classification processor 336 via network 320. In some embodiments, the first user device 304 is located within the network 320 and the second user device 504 is located outside of the network 320. The first and second user device 304, 504 may include a respective user interface 306, 506. The user interface 306, 506 may include a display for displaying the suspicious text message 308. The user interface 306, 506 may optionally include other terminal equipment that allows a user 302, 502 to interact with the first and second user device 304, 504, respectfully. The other terminal equipment may include, but is not limited to, a mouse, a touchscreen, a keyboard, and the like.

The first and second user device 304, 504 may include a respective processor 314, 514, a respective memory 316, 516, and a respective network interface 312, 512 configured to enable wired and/or wireless communications between the network 320 and the first and second user device 304, 504, as well as other components in the system 300. Suitable network interfaces 312, 512 include a WIFI interface, a local area network (LAN) interface, a wide area network (WAN) interface, a modem, a switch, or a router. The network interface 312, 512 may be configured to use any suitable type of communication protocol as would be appreciated by one of ordinary skill in the art.

The respective processor 314, 514 of the first and second user device 304, 504 is configured to send and receive data using the network interface 312, 512. Each processor 314, 514 is operatively coupled to a respective memory 316, 516. The memory 316, 516 may be a non-transitory computer readable medium. For example, the memory 316, 516 may be volatile or non-volatile and may comprise a read-only memory (ROM), random-access memory (RAM), ternary content-addressable memory (TCAM), dynamic random-access memory (DRAM), and static random-access memory (SRAM). The memory 316, 516 may be implemented using one or more disks, tape drives, solid-state drives, and/or the like. The memory 316, 516 is operable to store software instructions 318, 518. The software instructions 318, 518 may comprise any suitable set of instructions, logic rules or code operable to execute the processor 314, 514 to perform the operations of the user device 304, 504 described herein. In particular, the software instructions 318, 518 may include code for communicating the suspicious text message 308 between the user devices 304, 504 and to the classification processor 336.

The processor 314, 514 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the processor 314, 514 may be implemented in cloud devices, servers, virtual machines, and the like. The processor 314, 514 may be a programmable logic device, a microcontroller, a microprocessor, or any suitable combination of the preceding. The processor 314, 514 is configured to process data and may be implemented in hardware or software. For example, the processor 314, 514 may be 8-bit, 16-bit, 32-bit, 64-bit, or of any other suitable architecture. The processor 314, 514 may include an arithmetic logic unit (ALU) for performing arithmetic and logic operations, registers the supply operands to the ALU and store the results of ALU operations, and a control unit that fetches instructions from memory 316, 516 and executes them by directing the coordinated operations of the ALU, registers and other components. The processor 314, 514 is configured to implement various instructions described herein. For example, the processor 314, 514 is configured to execute instructions from the memory 316, 516 (e.g., software instructions 318, 518) to implement the functions of the processor 314, 514. In this way, processor 314, 514 may be a special-purpose computer designed to implement the functions disclosed herein. In an embodiment, the processor 314, 514 is implemented using logic units, FPGAs, ASICs, DSPs, or any other suitable hardware.

Network

Network 320 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 320 may be configured to support any suitable type of communication protocol as would be appreciated by one of ordinary skill in the art. In some embodiments, the network 320 facilitates the transfer of data between the first user device 304, the second user device 504, the classification server 335, and the database 332. In some embodiments, the network 320 facilitates the transfer of data between the classification server 335 and the blockchain network 344.

Database

The database 332 may be any storage architecture. Examples of the database 332 may include a data store, a data warehouse, a network-attached storage cloud, a storage area network, and any storage assembly directly (or indirectly) coupled to the classification processor 333 via the network interface 338, or any one or more components in the system 300. The database 132 is configured to store known hashed sensitive data 333. In some embodiments, the known hashed sensitive data 333 comprises sensitive data that has been converted into a hash value using a hashing function. Any suitable hashing function may be used including, but not limited to, MD5 hash functions, SHA-0 hash functions, SHA-1 hash functions, SHA-2 hash functions, SHA-3 hash functions, and the like. The known hashed sensitive data 333 includes a hash value (e.g., a unique identifier comprising a string or number of a fixed length that is generated as a result of the hashing function). In some embodiments, the known sensitive data prior to hashing includes known user identifiers (e.g., user IDs), known user passwords, known user account numbers, and information associated with data transfer interactions (e.g., wire transfer requests). In some embodiments, the database 332 is in communication with a third-party source that updates (e.g., intermittently or continuously) the database 332 with new, known sensitive data 333. Exemplary third-party sources include external databases or servers that contain known sensitive data.

Classification Server

The classification server 335 includes a network interface 338 configured to enable wired and/or wireless communications between the classification server 335 and other components in the system 300, such as the first user device 304, the second user device 504, the database 332, and the blockchain network 344. Suitable network interfaces 338 include a WIFI interface, a local area network (LAN) interface, a wide area network (WAN) interface, a modem, a switch, or a router. The network interface 338 may be configured to use any suitable type of communication protocol as would be appreciated by one of ordinary skill in the art.

The classification server 335 comprises a classification process 336. The classification processor 336 is configured to send and receive data using the network interface 338. The classification processor 336 is operatively coupled to a memory 340. The memory 340 may be a non-transitory computer readable medium. For example, the memory 340 may be volatile or non-volatile and may comprise a read-only memory (ROM), random-access memory (RAM), ternary content-addressable memory (TCAM), dynamic random-access memory (DRAM), and static random-access memory (SRAM). The memory 340 may be implemented using one or more disks, tape drives, solid-state drives, and/or the like. The memory 340 is operable to store software instructions 343. The software instructions 343 may comprise any suitable set of instructions, logic rules or code operable to execute the processor 338 to perform the operations of the classification processor 336 described herein.

The classification processor 336 is any is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the classification processor 336 may be implemented in cloud devices, servers, virtual machines, and the like. The classification processor 336 may be a programmable logic device, a microcontroller, a microprocessor, or any suitable combination of the preceding. The classification processor 336 is configured to process data and may be implemented in hardware or software. For example, the classification processor 336 may be 8-bit, 16-bit, 32-bit, 64-bit, or of any other suitable architecture. The classification processor 336 may include an arithmetic logic unit (ALU) for performing arithmetic and logic operations, registers the supply operands to the ALU and store the results of ALU operations, and a control unit that fetches instructions from memory 340 and executes them by directing the coordinated operations of the ALU, registers and other components. The classification processor 336 is configured to implement various instructions. For example, the classification processor 336 is configured to execute software instructions 343 from the memory 340 to implement the functions of the classification processor 336 described herein. In this way, classification processor 336 may be a special-purpose computer designed to implement the functions disclosed herein. In an embodiment, the classification processor 336 is implemented using logic units, FPGAs, ASICS, DSPs, or any other suitable hardware. In some embodiments, the classification processor 336 may be configured to perform quantum computing and processing.

In some embodiments, the classification processor 336 is configured to intercept the suspicious text message 308 sent between the first user device 304 and the second user device 504. The classification processor 336 is configured to process information data associated with the suspicious text message 308. For example, the classification processor 336 may parse the information data of the suspicious text message 308 into a plurality of data components. Exemplary data components include, but are not limited to, time stamp data, sender information data, recipient information data, text message content data such as sentences within the message data, a user identifier in the message data, a user password in the message data, a user account number in the message data, and/or information associated with a data transfer interaction in the message data.

The classification processor 336 is further configured to apply a hashing function to the information data of the suspicious text message 308 to generate hashed information data 342. In some embodiments, the classification processor 336 is configured to apply the hashing function to each of the plurality of data components such that the hashed information data 342 comprises a plurality of hashed data components. In some embodiments, the classification processor 336 is configured to store at least a portion of the hashed information data 342 in one or more of the plurality of network nodes 346 (a)-(n) in the blockchain network 344.

The classification processor 336 is configured to compare the hashed information data 342 to the known hashed sensitive data 333 in the database 332, and classify at least a portion of the hashed information data associated with the suspicious text message as containing sensitive data based on the comparison. In some embodiments, comparing the hashed information data 342 to the known hashed sensitive data 333 includes determining a similarity score that quantifies the similarity between the hashed information data 342 to the known hashed sensitive data 333, and comparing the similarity score to a threshold value. If the similarity score is below the threshold value, the classification processor 336 classifies the hashed information data 342 as containing legitimate data, and if the similarity score is above the threshold value, the classification processor 336 classifies the hashed information data 342 as containing sensitive data. In some embodiments, comparing the hashed information data 342 to the known hashed sensitive data 333 includes comparing the similarity score to a threshold percentage of the threshold value. For example, in some instances, if the similarity score is within a threshold percentage (e.g., within 1% to 20%) of the threshold value, the classification processor 336 may generate a notification that requests an analyst with administrative privileges in the network 320 to manually review the comparison before classifying the hashed information data 142 associated with the suspicious text message 308 as containing legitimate or malicious data. The classification processor 336 may assign weighted values (ranging between 0 to 1) to particular data components in the information data of the suspicious text message 308. Any suitable similarity score may be used including, but not limited to, K-means clustering, Hierarchical clustering, cosine similarity, kernel function, Euclidean distance, Manhattan distance, Minkowski distance, or the like. In some embodiments, after classifying at least a portion of the information data associated with the suspicious text message 308 as containing sensitive data, the classification processor 336 is further configured to capture the suspicious text message to prevent the suspicious text message from being communicated between the first user device and the second user device. In some embodiments, the classification processor is configured to generate a report that identifies the hashed information data as containing sensitive data. In some embodiments, the classification processor is configured to block the suspicious text message 308 from being communicated between the first user device 304 and the second user device 504. In some embodiments, after classifying at least a portion of the information data associated with the suspicious text message 308 as containing sensitive data, the classification processor 336 is further configured to delete the suspicious text message from the first user device 304.

Blockchain Network

Blockchain network 344 is a peer-to-peer network of network nodes 346 (a)-(n), and is generally configured to distribute hashed information data 342 (and any other data/information) among the network nodes 346 (a)-(n). In some embodiments, the blockchain network 344 is a distributed database in a network of network nodes 346 (a)-(n). In some embodiments, blockchain network 344 may be a public blockchain network. In some embodiments, blockchain network 344 may be a private blockchain network. For example, membership in the blockchain network 344 may be limited to nodes registered as belonging to and/or affiliated with the organization to which the network 320 belongs.

The blockchain network 344 may comprise any number of network nodes 346 (a)-(n) to form a distributed network that maintains a blockchain 350. Each network node 346 (a)-(n) may comprise a computing device, a virtual machine, a server, a workstation, and/or the like. Each network node 346 (a)-(n) of the blockchain network 344 stores a blockchain database 348 that is configured to store a copy of the blockchain 350. Each network node may include a blockchain processor 347 configured to perform any of the functions or actions of the network node 146 (a)-(n) described herein. The blockchain processor 347 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, the blockchain processor 347 may be implemented in cloud devices, servers, virtual machines, and the like. The blockchain processor 347 may be a programmable logic device, a microcontroller, a microprocessor, or any suitable combination of the preceding. The blockchain processor 347 is configured to process data and may be implemented in hardware or software. For example, the blockchain processor 347 may be 8-bit, 16-bit, 32-bit, 64-bit, or of any other suitable architecture. The blockchain processor 347 may include an arithmetic logic unit (ALU) for performing arithmetic and logic operations, registers the supply operands to the ALU and store the results of ALU operations, and a control unit that fetches instructions from the blockchain database 348 and executes them by directing the coordinated operations of the ALU, registers and other components. The blockchain processor 347 is configured to implement various instructions described herein. In this way, blockchain processor 347 may be a special-purpose computer designed to implement the functions disclosed herein. In an embodiment, the blockchain processor 347 is implemented using logic units, FPGAs, ASICS, DSPs, or any other suitable hardware. In some embodiments, the blockchain network 344 communicates with the classification processor 336 via network interface 338.

In some embodiments, the blockchain processor 347 is configured to establish consensus among the network nodes 346 (a)-(n) about the present state of the blockchain database 348. For example, the blockchain processor 347 may communicate with each respective network node 346 (a)-(n) to implement a consensus protocol procedure through which all the network nodes 346 (a)-(n) of the blockchain network 344 reach a common agreement about the present state of the blockchain database 348. In this way, each network node 346 (a)-(n) achieves reliability in the blockchain network 344 and establishes trust between the network nodes 346 (a)-(n) in a distributed computing environment. Essentially, the consensus protocol makes sure that every new block that is added to the blockchain 350 is the one and only version of the truth that is agreed upon by all the block in the blockchain 350. Blockchain 350 links together blocks of data, which store identifiable units called blockchain data entries. The blockchain data entry may be interchangeably referred to herein as a blockchain data entry. The blockchain data entries stored in the blockchain 350, may include information, files, and/or any other suitable type of data. For example, blockchain data entries may include hashed information data 342 received from the classification processor 336.

System Operation of FIG. 3

Figure 4:
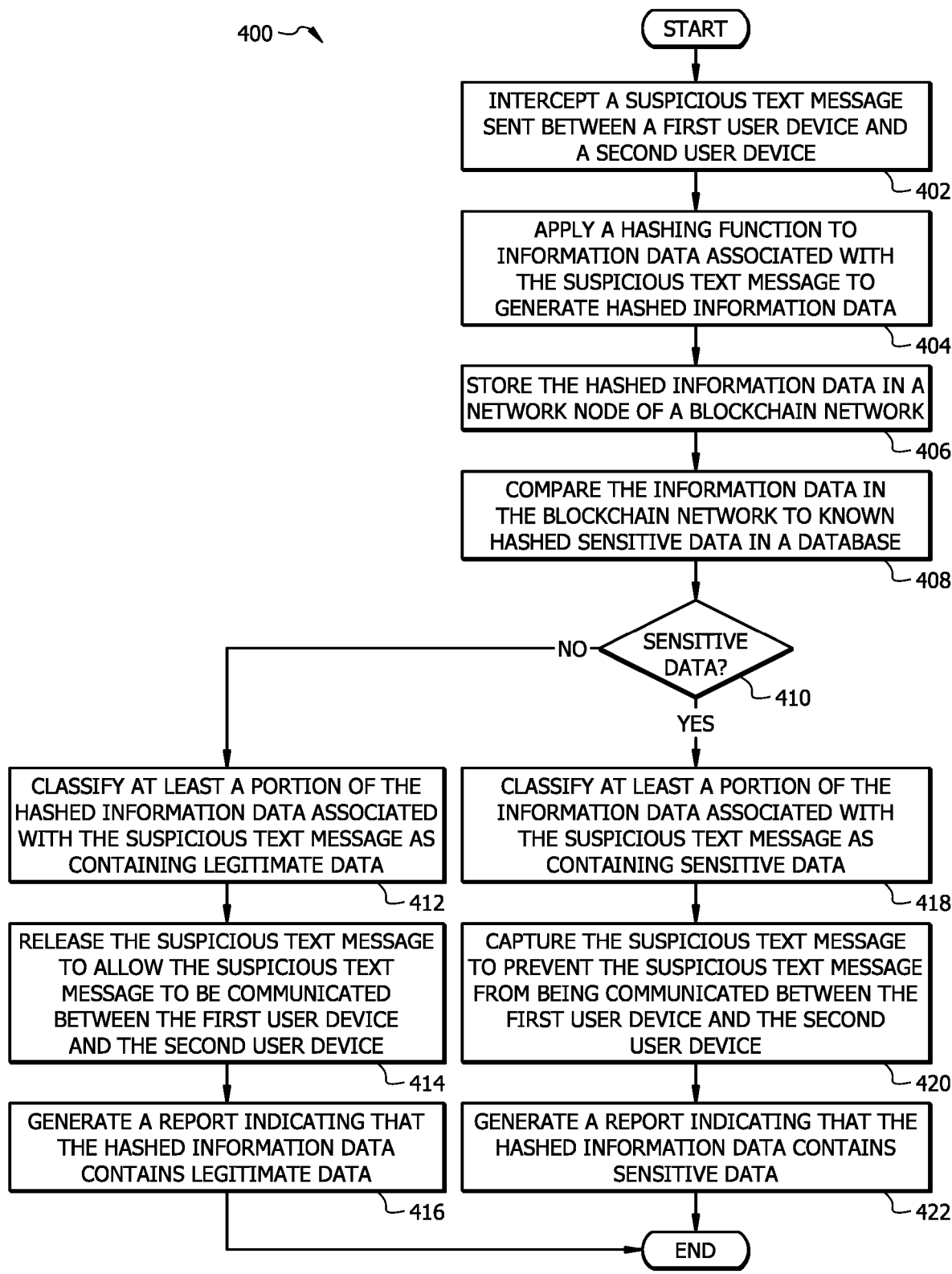
FIG. 4 illustrates a flowchart of a method according to the embodiment of FIG. 3.

FIG. 4 illustrates an operation flow 400 of the system of FIG. 3 for classifying a suspicious text message 308 sent between a first user device 304 and a second user device 504. The operational flow 400 can be logically described in two parts. The first part includes operations 402-408, which are generally directed to the classification processor 336 intercepting the suspicious text message 308 sent between the first user device 304 and the second user device 504, generating hashed information data 342 by applying a hashing function to information data associated with the suspicious text message 308, and storing the hashed information data 342 in one or more network node 346 (a)-(n) of a blockchain network 344. The first part further includes comparing the hashed information data 342 to known hashed sensitive data 333 in the database 332 and/or the blockchain network 344. The second part includes operations 212-222, which are generally directed to classifying at least a portion of the of the hashed information data 142 associated with the suspicious text message 108 as containing sensitive or legitimate data based on the comparison, capturing or releasing the suspicious text message 308 to allow or prevent the suspicious text message 308 from being communicated between the first user device 304 and the second user device 504, and generating a report indicating that the hashed information data 342 contains sensitive or legitimate data.

In operation, the operational flow 400 may begin at operation 402 where the classification processor 336 intercepts the suspicious text message 308 sent between the first user device 304 and the second user device 504. For example, the first user device 304 may have sensor tracking functionality installed on the first user device 304 to gather information data associated with the received suspicious text message 308 (e.g., device fingerprinting, applications installed and in use on the first device, linked contacts, etc.). In some embodiments, the classification processor 336 communicates with the sensor tracking functionality to intercept the suspicious text message 308. In general, the classification processor 336 receives the suspicious text message 308 and processes information data associated with the suspicious text message 308. For example, operation 402 may further comprise parsing the information data associated with the suspicious text message 308 into a plurality of data components. For example, as discussed above, the information data associated with the suspicious text message 308 may be parsed into data components time stamp data, sender information data, recipient information data, text message content data such as sentences within the message data, a user identifier in the message data, a user password in the message data, a user account number in the message data, and/or information associated with a data transfer interaction in the message data.

At operation 404, the classification processor 336 applies the hashing function to the information data of the suspicious text message 308 to generate hashed information data 342. In some embodiments, the classification processor 336 applies the hashing function to each of the plurality of data components to generate hashed information data 342 that comprises a plurality of hashed data components. At operation 406, the classification processor 336 stores at least a portion of the hashed information data 342 in one or more of the plurality of network nodes 346 (a)-(n) in the blockchain network 344. In some embodiments, the classification processor 336 stores at least a portion of the plurality of hashed data components of the hashed information data 342 in one or more of the plurality of network nodes 346 (a)-(n) in the blockchain network 344. As will be detailed below, the classification processor 336 may store the hashed information data 342 that is classified as containing sensitive data in the blockchain network 344.

At operation 408, the classification processor 336 compares the hashed information data 342 to the known hashed sensitive data 334 in the database 332 and/or in the blockchain network 344 to determine at decision block 410 if at least a portion of the hashed information data 342 contains sensitive data or legitimate data. In some embodiments, the classification processor 336 may compare each of the plurality of the hashed data components of the information data to the known hashed sensitive data 333. In some embodiments, comparing the hashed information data 342 to the known hashed sensitive data 332 includes determining a similarity score that quantifies the similarity between the hashed information data 342 (e.g., the data components of the hashed information data 342) to the known hashed sensitive data 333, and comparing the similarity score to a threshold value. For example, at least a portion of the hashed data components in the hashed information data 342 may have a similarity score above the threshold value and may be classified as containing sensitive data, while another portion of the hashed data components in the hashed information data 342 may have a similarity score below the threshold value and may be classified as containing legitimate data. In some embodiments, comparing the hashed information data 342 to the known hashed sensitive data 333 includes comparing the similarity score to a threshold percentage of the threshold value. For example, in some instances, if the similarity score is within a threshold percentage (e.g., within 1% to 20%) of the threshold value, the classification processor 336 may generate a notification that requests an analyst with administrative privileges in the network 320 to manually review the comparison before classifying the hashed information data 142 associated with the suspicious text message 308 as containing legitimate or malicious data.

Any suitable similarity score may be used including, but not limited to, K-means clustering, Hierarchical clustering, cosine similarity, kernel function, Euclidean distance, Manhattan distance, Minkowski distance, or the like.

If the similarity score is below the threshold value, the classification processor 336 classifies the hashed information data 342 as containing legitimate data at operation 412. At operation 414, after classifying the hashed information data 342 as containing legitimate data, the classification processor 336 releases the suspicious text message 308 to allow the suspicious text message 308 to be communicated between the first user device 302 and the second user device 402. In some embodiments, if the similarity score is within the threshold percentage of the threshold value, the analyst may manually review and provide input to the classification processor 336 to classify the hashed information data 342 as containing legitimate data. At operation 416, the classification processor 336 optionally generates a report, or otherwise generates a notification, that identifies the hashed information data 342 as containing legitimate data. In some embodiments, the report or notification may be optionally stored in the blockchain 350 of the blockchain network 344 and/or communicated to an analyst with administrative privileges in the network 320 for review and further manual analysis. In some embodiments, the classification processor 336 compares the hashed information data 342 to the known hashed sensitive data 333 using a pattern matching technique to classify if the hashed information data 342 contains sensitive data or legitimate data. For example, operation 408 may include identifying a regular expression (e.g., regex) pattern for the hashed information data 342 within the known hashed sensitive data 333 and classifying the hashed information data 342 as containing legitimate data or malicious data based on the comparison. For example, the regular expression pattern may be a sequence of characters that specifies a match pattern.

Returning back to decision block 410, if the similarity score is above the threshold value, the classification processor 336 classifies the hashed information data 342 as containing sensitive data at operation 418. In some embodiments, if the similarity score is within the threshold percentage of the threshold value, the analyst may manually review and provide input to the classification processor 336 to classify the hashed information data as containing sensitive data. At operation 420, after classifying the hashed information data 342 as containing sensitive information, the classification processor 336 captures the suspicious text message 308 to prevent the suspicious text message 308 from being communicated between the first user device 302 and the second user device 402. In some embodiments, after classifying at least a portion of the hashed information data 342 as containing sensitive data, the classification processor 336 is configured to update the blockchain network 344 and/or the database 332 and known hashed sensitive data 333 to include the portion of hashed information data 342 that is classified as containing the sensitive data (e.g., the blockchain network 344 and/or the database 332 may be updated with one or more hashed data components of the hashed information data 342 identified as containing sensitive data). At operation 422, the classification processor 336 optionally generates a report, or otherwise generates a notification, that identifies the hashed information data 342 as containing sensitive data. In some embodiments, the report or notification may be optionally stored in the blockchain 350 of the blockchain network 344 and/or communicated to an analyst with administrative privileges in the network 340 for review and manual analysis. In some embodiments, after classifying at least a portion of the hashed information data associated with the suspicious text message as containing sensitive data, operation 420 comprises using the classification processor 336 to block communication between the first user device 304 and the second user device 504, and may optionally delete the suspicious text message 308 from the first user device 304.

In one non-limiting example, the classification processor 336 may receive the suspicious text message 308 at operation 402 and parse the information data associated with the suspicious text message 308 into a first data component (e.g., a potential user password in the message data) a second data component (e.g., a potential user account number in the message data). The classification processor 336 may apply the hashing function at operation 404 to the first data component and the second data component to generate a first hashed data component and a second hashed data component. At operation 406, the classification processor 336 may store the first hashed data component and the second hashed data component in one or more of the plurality of network nodes 346 (*a*)-(*n*) of the blockchain network 344. At operation 308, the classification processor 336 may compare the first hashed data component and the second hashed data component to known hashed sensitive data 334 in the database 332. In this example, the known hashed sensitive data 333 includes a hash value that substantially corresponds to the second hashed data component, while the first hashed data component does not substantially correspond to any hash value in the known hashed sensitive data 333. That is, a similarity score is calculated between the hash value in the known hashed sensitive data 333 and the second hashed data component, where it is determined that the similarity score exceeds a threshold value, while the similarity scores for the first hashed data component does not exceed a threshold value with any of the hash values in the known hashed sensitive data 333. At operation 412, the classification processor 336 classifies, based on the comparison, the first hashed data component as legitimate and the second hashed data component containing sensitive data.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for classifying a suspicious text message, the system comprising:
   a database operable to store known hashed malicious data, wherein the known hashed malicious data comprises known malicious data converted into a hash value using a hashing function;
   a blockchain network comprising a plurality of network nodes that form a distributed network configured to maintain a blockchain, each network node of the blockchain network comprising a blockchain processor configured to distribute hashed information data associated with the suspicious text message among the plurality of network nodes;
   a classification processor operably coupled to the database and the blockchain network, the classification processor configured to:
      receive the suspicious text message from a user device, the suspicious text message comprising information data;
      apply the hashing function to the information data of the suspicious text message to generate hashed information data;
      store at least a portion of the hashed information data in one or more of the plurality of network nodes in the blockchain network;
      compare the hashed information data to the known hashed malicious data in the database; and
      classify, based on the comparison, at least a portion of the hashed information data associated with the suspicious text message as containing malicious data.

2. The system of claim 1, wherein the suspicious text message is received by the classification processor in response to a user selecting a report message feature on the user device.

3. The system of claim 1, wherein the classification processor is further configured to:
   parse the information data associated with the suspicious text message into a plurality of data components;
   apply the hashing function to each of the plurality of data components to generate a plurality of hashed data components;
   store at least a portion of the plurality of hashed data components in one or more of the plurality of network nodes in the blockchain network;
   compare the plurality of hashed data components to the known hashed malicious data in the database; and
   classify, based on the comparison, at least a portion of the hashed data components as containing the malicious data.

4. The system of claim 1, wherein the classification processor is further configured to:
   parse the information data associated with the suspicious text message into at least a first data component, a second data component, and a third data component;
   apply the hashing function to the first data component, the second data component, and the third data component to generate a first hashed data component, a second hashed data component, and a third hashed data component, respectively;
   store the first hashed data component, the second hashed data component, and the third hashed data component in the blockchain network;

compare the first hashed data component, the second hashed data component, and the third hashed data component to the known hashed malicious data in the database;

classify, based on the comparison, the first hashed data component as legitimate, the second hashed data component as legitimate, and the third hashed data component as malicious.

5. The system of claim 3, wherein the plurality of data components associated with the information data comprise two or more of time stamp data, text message content data, sender information data, recipient information data, and text message image data.

6. The system of claim 1, wherein after classifying at least a portion of the information data associated with the suspicious text message as containing the malicious data, the classification processor is further configured to delete the suspicious text message from the user device, and block a sender associated with the suspicious text message on the user device.

7. The system of claim 1, wherein after classifying at least a portion of the hashed information data associated with the suspicious text message as containing malicious data, the classification processor is configured to block a sender associated with the suspicious text message on the user device.

8. A method for classifying a suspicious text message on a user device, the method comprising:

communicating between a classification processor and the user device, wherein the classification processor receives the suspicious text message from the user device, the suspicious text message having information data;

applying, using the classification processor, a hashing function to the information data of the suspicious text message to generate hashed information data;

storing, using the classification processor, at least a portion of the hashed information data in one or more of a plurality of network nodes in a blockchain network, wherein the plurality of network nodes form a distributed network configured to maintain a blockchain, and wherein each network node in the blockchain network comprises a blockchain processor configured to distribute the hashed information data associated with the suspicious text message among the plurality of network nodes;

comparing, using the classification processor, the hashed information data to the known hashed malicious data stored in a database; and classifying, using the classification processor, at least a portion of the information data associated with the suspicious text message as containing malicious data based on the comparison.

9. The method of claim 8, wherein the suspicious text message is received by the classification processor in response to a user selecting a report message feature on the user device.

10. The method of claim 8 comprising:

parsing, using the classification processor, the information data associated with the suspicious text message into a plurality of data components;

applying, using the classification processor, the hashing function to each of the plurality of data components to generate a plurality of hashed data components;

storing, using the classification processor, at least a portion of the plurality of hashed data components in one or more of the plurality of network nodes in the blockchain network;

comparing, using the classification processor the plurality of hashed data components to the known hashed malicious data in the database; and classifying, using the processor, at least a portion of the hashed data components as containing the malicious data based on the comparison.

11. The method of claim 8 comprising:

parsing the information data associated with the suspicious text message into at least a first data component, a second data component, and a third data component;

applying the hashing function to the first data component, the second data component, and the third data component to generate a first hashed data component, a second hashed data component, and a third hashed data component, respectively;

storing the first hashed data component, the second hashed data component, and the third hashed data component in the blockchain network;

comparing the first hashed data component, the second hashed data component, and the third hashed data component to the known hashed malicious data in the database;

classifying, based on the comparison, the first hashed data component as legitimate, the second hashed data component as legitimate, and the third hashed data component as malicious.

12. The method of claim 8, wherein after classifying at least a portion of the information data associated with the suspicious text message as containing malicious data, the method further comprises deleting the suspicious text message from the user device.

13. The method of claim 8, wherein after classifying at least a portion of the information data associated with the suspicious text message as containing malicious data, the method further comprises blocking a sender associated with the suspicious text message on the user device.

14. The method of claim 10, wherein the plurality of data components associated with the information data comprise two or more of time stamp data, text message content data, sender information data, recipient information data, and text message image data.

15. A non-transitory computer-readable medium storing instructions that when executed by a classification processor cause the classification processor to:

communicate with a user device, wherein the classification processor receives a suspicious text message from the user device, the suspicious text message having information data;

apply a hashing function to the information data of the suspicious text message to generate hashed information data;

store at least a portion of the hashed information data in one or more of a plurality of network nodes in a blockchain network, wherein the plurality of network nodes form a distributed network configured to maintain a blockchain, and wherein each network node in the blockchain network comprises a blockchain processor configured to distribute the hashed information data associated with the suspicious text message among the plurality of network nodes;

compare the hashed information data to the known hashed malicious data stored in a database; and classify at least a portion of the information data associated with the suspicious text message as containing malicious data based on the comparison.

16. The non-transitory computer-readable medium of claim 15, wherein the suspicious text message is received by the classification processor in response to a user selecting a report message feature on the user device.

17. The non-transitory computer-readable medium of claim 15, wherein the instructions further cause the processor to:
parse the information data associated with the suspicious text message into a plurality of data components;
apply the hashing function to each of the plurality of data components to generate a plurality of hashed data components;
store at least a portion of the plurality of hashed data components in one or more of the plurality of network nodes in the blockchain network;
compare the plurality of hashed data components to the known hashed malicious data in the database; and
classify, based on the comparison, at least a portion of the hashed data components as containing malicious data.

18. The non-transitory computer-readable medium of claim 15, wherein the instructions further cause the processor to:
parse the information data associated with the suspicious text message into at least a first data component, a second data component, and a third data component;
apply the hashing function to the first data component, the second data component, and the third data component to generate a first hashed data component, a second hashed data component, and a third hashed data component, respectively;
store the first hashed data component, the second hashed data component, and the third hashed data component in the blockchain network;
compare the first hashed data component, the second hashed data component, and the third hashed data component to the known hashed malicious data in the database;
classify, based on the comparison, the first hashed data component as legitimate, the second hashed data component as legitimate, and the third hashed data component as malicious.

19. The non-transitory computer-readable medium of claim 17, wherein the plurality of data components associated with the information data comprise two or more of time stamp data, text message content data, sender information data, recipient information data, and text message image analysis data.

20. The non-transitory computer-readable medium of claim 15, wherein after classifying at least a portion of the information data associated with the suspicious text message as being malicious, and wherein the instructions further cause the processor to delete the suspicious text message and block a sender associated with the suspicious text message on the user device.

* * * * *